Nov. 30, 1926.
J. C. KRANER
1,609,173
VEHICLE FOR CHILDREN
Filed Jan. 16, 1926   2 Sheets-Sheet 1
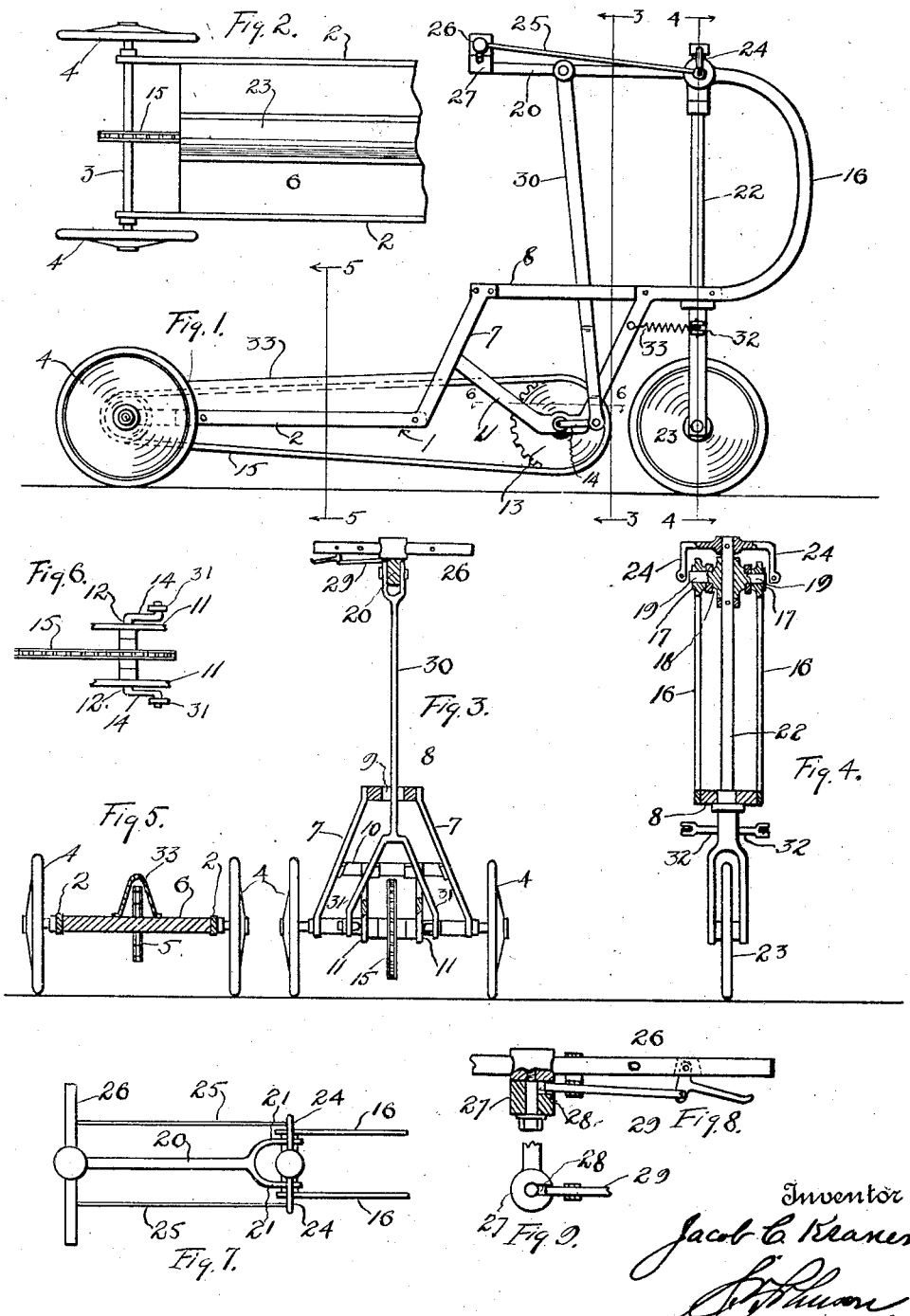
Inventor
Jacob C. Kraner
Attorney

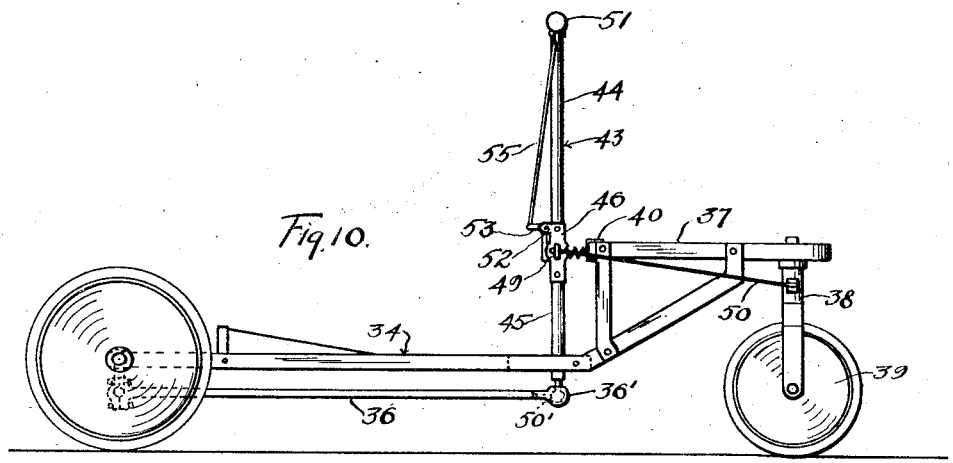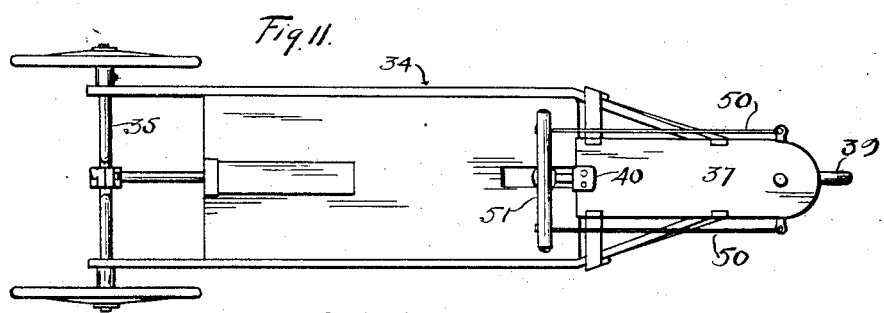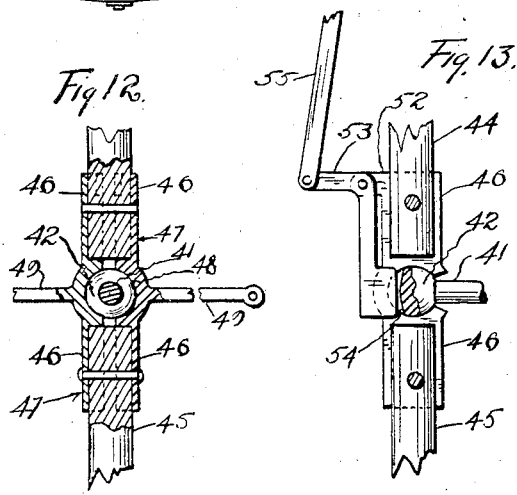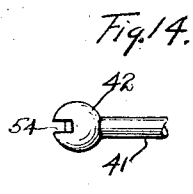

Patented Nov. 30, 1926.

1,609,173

UNITED STATES PATENT OFFICE.

JACOB C. KRANER, OF PICKERINGTON, OHIO.

VEHICLE FOR CHILDREN.

Application filed January 16, 1926. Serial No. 81,711.

The present invention is directed to improvements in hand propelled vehicles for children.

The primary object of the invention is to provide a device of this character so constructed that a child occupying the same can with comparative ease propel the vehicle through the medium of a hand actuated lever.

A further object of the invention is to provide a vehicle of this type wherein the mechanism for guiding the vehicle is mounted on the hand propelling lever and may be operated during the operation of said lever.

With these and other objects in view, this invention resides in the novel features of construction, formation, combination and arrangement of parts to be hereinafter more fully described, claimed and illustrated in the accompanying drawings, in which:—

Figure 1 is a side elevation.

Figure 2 is a fragmentary top plan view.

Figure 3 is a sectional view on line 3—3 of Figure 1.

Figure 4 is a sectional view on line 4—4 of Figure 1.

Figure 5 is a sectional view on line 5—5 of Figure 1.

Figure 6 is a sectional view on line 6—6 of Figure 1.

Figure 7 is a fragmentary top plan view of the lever and its associated elements.

Figure 8 is a detail sectional view of the handle latch.

Figure 9 is a detail view of the head.

Figure 10 is a side elevation of a modified form.

Figure 11 is a top plan view thereof.

Figure 12 is a vertical sectional view through the lever socket member.

Figure 13 is a similar view taken at right angles to Figure 12.

Figure 14 is a detail view of the ball.

Referring to the drawings, 1 designates a frame consisting of spaced side sills 2, the rear ends of which are supported by the axle 3 and upon which are mounted wheels 4, said axle having a sprocket wheel 5 fixed thereto.

A platform 6 is engaged between the side sills 2 and supported thereby and it is upon this platform that the child stands when operating the vehicle.

The forward ends of the sills 2 terminate in upwardly and forwardly inclined bars 7 between which is secured the rear end of the block 8, said block having a longitudinal slot 9 formed therein.

Having their rear ends fixed to the cross brace 10 carried by the bars 7 are the rear ends of the downwardly curved brackets 11, the forward ends of which are secured to forward end of the block 8, there being a driving shaft 12 journaled in the brackets and to which is fixed the sprocket wheel 13, the ends of said shaft being provided with cranks 14. A sprocket chain 15 is trained around the sprocket wheels 5 and 13.

The forward ends of the brackets 11 terminate in vertically disposed forwardly bowed arms 16, the upper ends of which being provided with bearings 17. Disposed between the bearings 17 is a collar 18 having trunnions 19 adapted to engage said bearings.

The hand operated power lever 20 has its forward end forked, the arms 21 of which being pivotally engaged with the respective trunnions 19.

Journaled in the forward end of the block 8 is the steering rod 22, the lower end of which is provided with a steering wheel 23, while the upper end thereof is journaled in the collar 18. Diametrically disposed pintles 24 are carried by the upper end of the rod 22 and to which are suitably connected the forward ends of the guiding links 25, the rear ends of which being suitably connected with the cross handle 26. This handle is pivotally mounted upon the head 27 carried by the rear end of the lever 20, there being a notch 28 in the head for engagement with the latch bar 29 pivotally mounted upon said handle. In this manner the handle 26 can be interlocked with the lever 20 to hold the guiding links 25 inactive when it is not desired to rotate the rod 22, but it will be of course understood that when it is desired to steer the vehicle the latch bar is released from the notch 28 to permit the handle 26 to be turned.

Having its upper ends pivotally connected to the lever 20 is a pitman 30, the lower end of which being provided with furcations 31 for pivotally engaging the cranks 14. It will be obvious that upon rocking the lever 20 the pitman 30 will be actuated to impart rotary movement to the sprocket wheel 13, thus causing the sprocket chain 15 to transmit rotary motion to the rear axle 3.

If desired arms 32 may be mounted upon the rod 22 and to which the outer ends of the coil springs 32 are secured, the rear ends of which be fixed to the brackets 11, said springs serving to hold the vehicle in a straight course.

Since the sprocket chain 15 runs over the platform 6 a sheet metal guard 33 is employed to cover the same so that a child can stand upon said platform with safety.

In the modified form of the invention, as shown in Figures 10 to 14 inclusive, the frame 34 is provided with a rear crank axle 35 to which is connected the pitman 36, the forward end of which is provided with a socket 36′. The forward part of the frame supports a block 37 and pivotally connected to the forward end of which is the steering rod 38 and wheel 39. A clip 40 is secured to the rear end of the block 37 and supports a rod 41 provided with a ball 42. The hand power lever 43 consists of upper and lower sections 44 and 45, respectively, the adjacent ends of which are clamped between the plates 46 of the complementary members 47 forming a socket 48 for receiving the ball 42. The members 48 are provided with lateral arms 49 and to which are secured the rear ends of the guiding links 50.

The lower end of the section 45 is provided with a ball adapted to engage in the socket 36. In this manner the hand lever can be oscillated through the medium of the cross handle 51 to actuate the links 50 to guide the vehicle or can be rocked back and forth to actuate the pitman to rotate the rear axle 35. Thus it will be seen that in both forms of my invention the hand levers can be operated to simultaneously drive and steer the vehicles.

The upper plates 46 are provided with ears 52 for pivotally supporting the bell-crank lever 53, the lower end of which being adapted to engage the groove 54 of the ball 42 to normally hold the lever 43 against rotation. A link 55 has its lower end connected to the lever 53 and its upper end connected to the handle 51 in any suitable manner. Upon shifting the link 55 the bell crank can be operated to disengage the groove 43 to permit the lever 43 to be turned in order to guide the vehicle.

What is claimed is:—

1. A vehicle of the class described, comprising a frame, rear driving wheels associated with the frame, a steering rod connected with the frame and having a wheel thereon, bearings carried by the frame, a collar supported between the bearings, said steering rod being journaled in the collar, a hand actuated lever pivotally connected with the collar, a handle pivotally mounted on the lever, links connecting the handle and steering rod to rotate the same upon rotation of the handle, and means associated with the lever for driving the rear wheels.

2. A vehicle of the class described, comprising a frame, rear driving wheels for the frame, a block associated with the frame, brackets supported by the block and frame, a sprocket wheel supported by the brackets and having driving connection with said wheels, a steering rod journaled in the block, said brackets having arms provided with bearings, a collar having trunnions for engaging the bearings, the steering rod having its upper end provided with pintles, a hand actuated lever pivotally connected to the trunnions, a handle pivotally interlocked with said lever, links connecting the handle and pintles, and a pitman operable by the lever for driving the sprocket wheel.

3. A vehicle of the class described, comprising a wheeled supported frame, a hand operated lever for propelling the vehicle, a handle carried by the lever, links operable by the handle for steering the vehicle, and means for normally interlocking the handle and lever, as and for the purpose set forth.

In testimony whereof I affix my signature.

JACOB C. KRANER.